United States Patent
Sekine et al.

(12)
(10) Patent No.: US 6,206,180 B1
(45) Date of Patent: Mar. 27, 2001

(54) VIBRATORY PARTS-FEEDER

(75) Inventors: Toshiro Sekine; Eiji Ohki; Masanobu Tomita; Hirohiko Murata, all of Toyohashi; Kazumichi Kato, Ise; Yasushi Muragishi, Ise; Tetsuyuki Kimura, Ise, all of (JP)

(73) Assignee: Shinko Electric Co., Ltd. (JP)

( * ) Notice: Subject to any disclaimer, the term of this patent is extended or adjusted under 35 U.S.C. 154(b) by 0 days.

(21) Appl. No.: 09/162,432

(22) Filed: Sep. 28, 1998

(30) Foreign Application Priority Data

Sep. 30, 1997 (JP) .................................................... 9-284601

(51) Int. Cl.⁷ .................................................... B65G 27/02
(52) U.S. Cl. .................................................... 198/757; 198/769
(58) Field of Search .................................... 198/757, 762, 198/769, 766

(56) References Cited

U.S. PATENT DOCUMENTS

| 3,315,793 | * | 4/1967 | Yakubovich | 198/757 |
| 4,350,243 | * | 9/1982 | Weyandt | 198/757 |
| 4,362,455 | * | 12/1982 | Hirose | 198/757 |
| 4,369,398 | * | 1/1983 | Lowry, Sr. | 198/751 |
| 5,042,643 |   | 8/1991 | Akama | 198/753 |
| 5,865,297 | * | 2/1999 | Chinb et al. | 198/762 |
| 5,883,478 | * | 3/1999 | Thesling | 198/762 |
| 6,044,710 | * | 4/2000 | Kurita et al. | 198/757 |

FOREIGN PATENT DOCUMENTS 288 706 * 11/1988 (EP) ...................................... 198/757

* cited by examiner

Primary Examiner—Douglas Hess
(74) Attorney, Agent, or Firm—Carothers & Carothers

(57) ABSTRACT

In a vibratory parts-feeder including; a feeder bowl in which a spiral track is formed, a vertical exciter with first electro-magnetic coil for exciting the feeder bowl in the vertical direction, a horizontal exciter with second electro-magnetic coil for exciting the feeder bowl in the horizontal direction, horizontal leaf springs for supporting the feeder bowl so as to be vibratile in the vertical direction, and vertical leaf springs for supporting the feeder bowl so as to be vibratile in the horizontal direction, wherein there is a phase difference between the currents flowing through the first and second electro-magnetic coils and the feeder bowl is elliptically vibrated, the improvements in which a phase adjusting circuit is connected to the first or second electro-magnetic coil, voltage adjusting circuits are connected to the first and second electro-magnetic coils and the ratio of the longer axis to the shorter axis of the elliptical vibration and the inclination of the longer axis thereof are varied with the adjustment of the phase adjusting circuit and the voltage adjusting circuits.

3 Claims, 10 Drawing Sheets

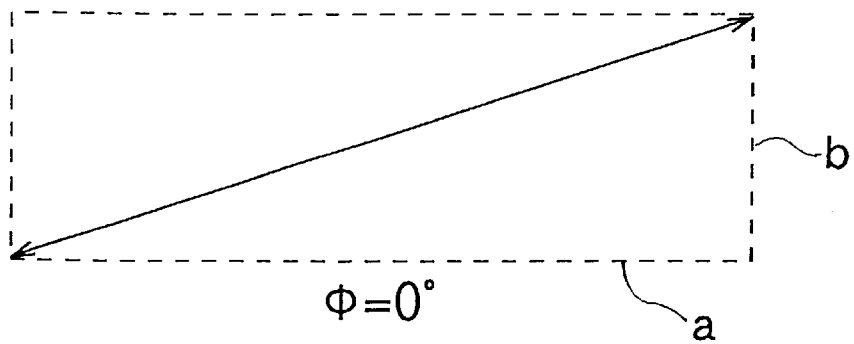
FIG.5 A    Φ=0°
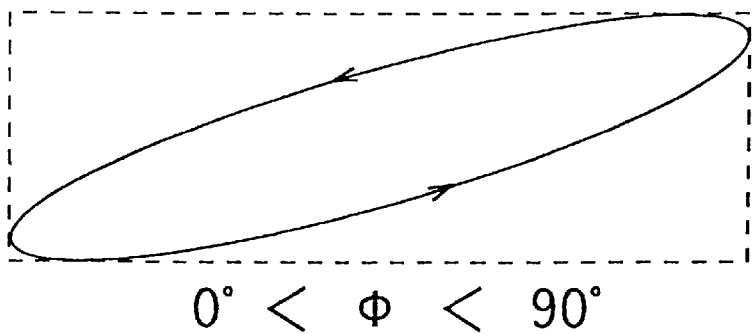
FIG.5 B    0° < Φ < 90°
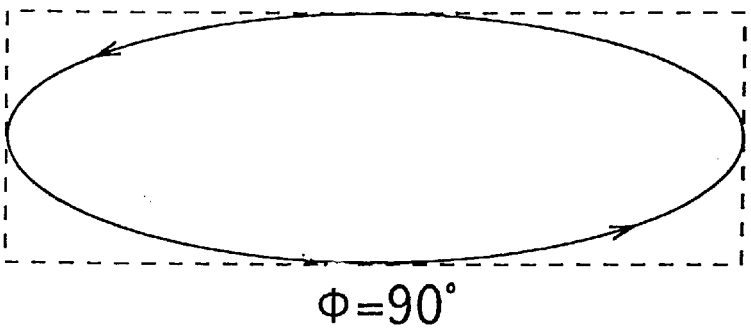
FIG.5 C    Φ=90°
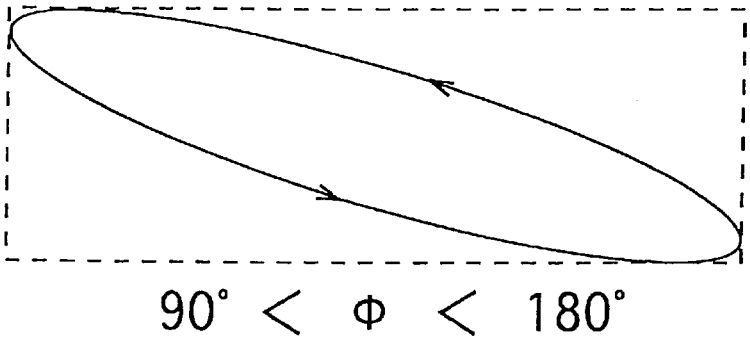
FIG.5 D    90° < Φ < 180°

Φ=180°

180° < Φ < 270°

Φ=270°

270° < Φ < 360°

Φ=180°

Φ=270°

180° < Φ < 270°

270° < Φ < 360°

VIBRATORY PARTS-FEEDER

BACKGROUND OF THE INVENTION

1. Field of the Invention

This invention relates to a vibratory parts-feeder.

2. Description of the Prior Art

A vibratory part-feeding device in which parts or workpieces are transported on a spiral track formed in a feeder bowl by torsional vibration, is widely known. Generally, it is provided with any posture-regulating means for putting the feeding part into a predetermined posture. The parts are supplied one by one under the predetermined posture to the next process from the vibratory part-feeding-device. However, some kinds of parts or parts of some shapes are apt to jam at the posture-regulating means. When the parts are jammed, they cannot be fed to the downstream side. The part-jamming is detected by any detecting means. A jam-releasing means such as air-jetting means is actuated with the detecting output of the detecting means. The jammed parts are forcibly ejected to the inside of the feeder bowl.

For example, the manufacture for attaching the air-jetting means to the feeder bowl is required for the feeder bowl. Further in some cases, a through hole for passing the jetted air should be made in the side wall of the feeder bowl. A manufacturing operation for making the through hole is very troublesome. The part-jamming cannot be released in some manufacturing errors of the through hole which direction, for example, is somewhat deviated from the predetermined direction.

Recently, an elliptic vibratory part-feeding device was developed, in which the feeder bowl is vibrated in an elliptical manner. A locus of the vibrating point on the wall surface of the feeder bowl is elliptic in the elliptic vibratory part-feeding device. Generally, a feeding speed of an elliptic vibratory part-feeding device is higher than that of a usual vibratory part-feeding device in which a locus of the point on the wall surface of the feeder bowl is linear along the curved surface of the wall of the feeder bowl. The part-jamming is more apt to occur in the elliptic vibratory part-feeding device than in the usual vibratory part-feeding device.

The same assignee (Shinko Electric Co., Ltd.) previously developed the elliptical vibratory part-feeding device disclosed in the U.S. Pat. No. 5,042,643 in which the part-jamming means is arranged, and when part-jamming is detected by the means, the feeding direction of the parts is reversed by the change-over of the phase-difference forming means. The jamming can be released without special manufacture and at lower cost.

However, since the phase difference is constant, only two elliptical vibrations of constant longer and shorter axis can be obtained. Parts of some kinds are frequently jammed and so changes of directions have to frequently be effected.

SUMMARY OF THE INVENTION

Accordingly, it is an object of this invention to provide a vibratory parts-feeder which can handle parts of all kinds at the optimum conditions.

Another object of this invention is to provide a vibratory parts-feeder in which there occurs seldom parts-jamming and, even when the parts-jamming occurs, it can be removed at once.

In accordance with an aspect of this invention, a vibratory parts-feeder comprising (A) a feeder bowl in which a spiral track is formed,
(B) a vertical exciter with first electro-magnetic coil for exciting said feeder bowl in the vertical direction,
(C) a horizontal exciter with second electro-magnetic coil for exciting said feeder bowl in the horizontal direction,
(D) first spring means for supporting said feeder bowl so as to be vibratile in the vertical direction, and
(E) second spring means for supporting said feeder bowl so as to be vibratile in the horizontal direction , wherein there is a phase difference between the currents flowing through said first and second electro-magnetic coils and said feeder bowl is elliptically vibrated, the improvements in which phase adjusting means is connected to said first or second electromagnetic coil, and the inclination of the long axis of the elliptical vibration and the ratio of the longer to the shorter axis of the elliptical vibration are varied with the adjustment of said phase adjusting means.

In accordance with another aspect of this invention, a vibratory parts-feeder comprising;

(A) a feeder bowl in which a spiral track is formed,
(B) a vertical exciter with first electromagnetic coil for exciting said feeder bowl in the vertical direction,
(C) a horizontal exciter with second electromagnetic coil for exciting said feeder bowl in the horizontal direction,
(D) first spring means for supporting said feeder bowl so as to be vibratile in the vertical direction, and
(E) second spring means for supporting said feeder bowl so as to be vibratile in the horizontal direction , wherein there is a phase difference between the currents flowing through said first and second electromagnetic coils and said feeder bowl is elliptically vibrated, the improvements in which phase adjusting means is connected to said first or second electromagnetic coil, and said feeder bowl is vibrated elliptically or linearly with the adjustment of said phase adjusting means.

In accordance with a further aspect of this invention, a vibratory parts-feeder comprising;

(A) a feeder bowl in which a spiral track is formed,
(B) a vertical exciter with first electromagnetic coil for exciting said feeder bowl in the vertical direction,
(C) a horizontal exciter with second electromagnetic coil for exciting said feeder bowl in the horizontal direction,
(D) first spring means for supporting said feeder bowl so as to be vibratile in the vertical direction, and
(E) second spring means for supporting said feeder bowl so as to be vibratile in the horizontal direction , wherein there is a phase difference between the currents flowing through said first and second electromagnetic coils and said feeder bowl is elliptically vibrated, the improvements in which phase adjusting means is connected to said first or second electromagnetic coil, voltage adjusting means is connected at least to one of said first and second electromagnetic coils and the inclination of the long axis of the elliptical vibration and the ratio of the longer to shorter axis thereof or the inclination of the linear vibration is varied with the adjustment of said phase adjusting means and said voltage adjusting means.

The foregoing and other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 5A to FIG. 5D show respective modes of elliptical vibrations obtained by the adjustments of the phase adjusting circuit;

DESCRIPTION OF THE PREFERRED EMBODIMENTS

Figure 1:
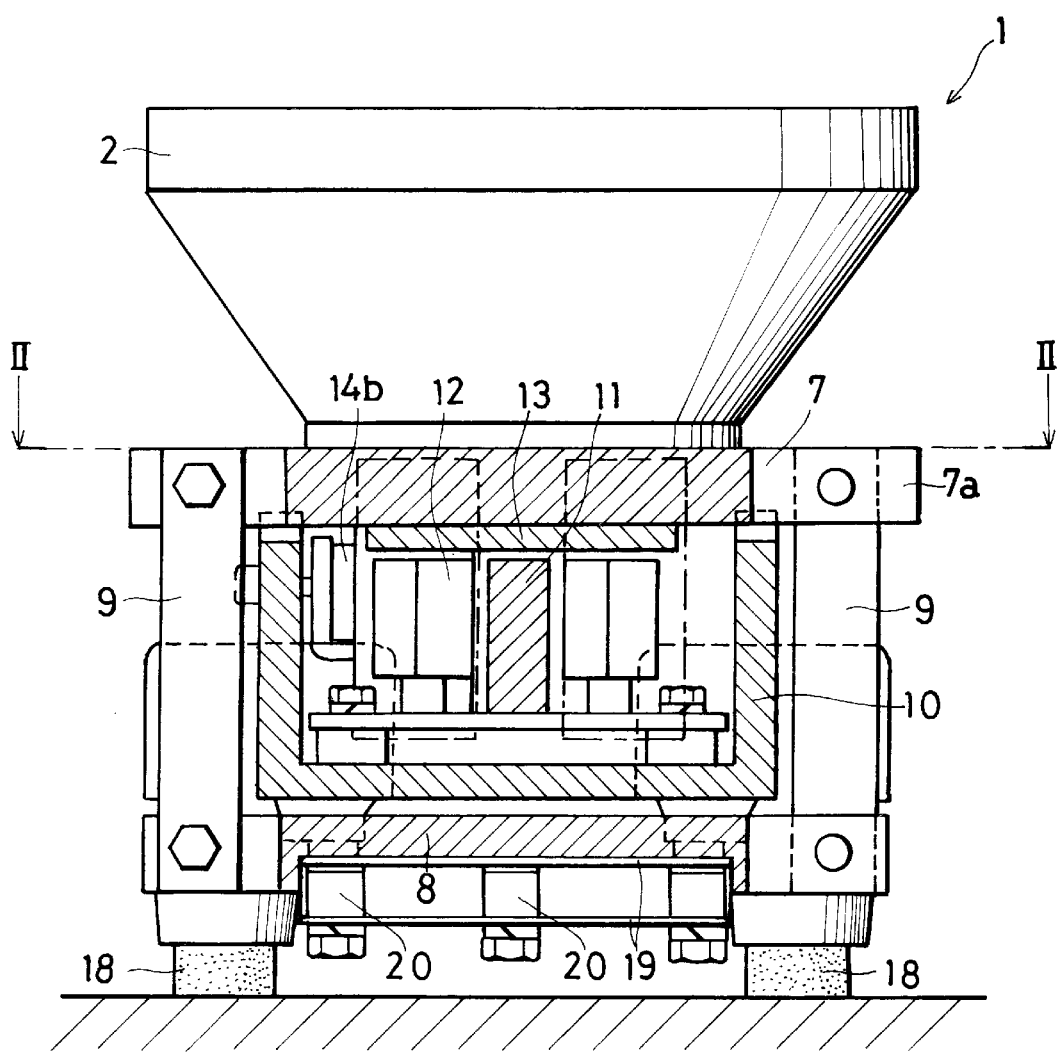
FIG. 1 is a partially cross-sectional front view of an elliptic vibratory part-feeding device according to the Prior Art.

First, an elliptic vibratory part-feeding device which is the prior art and is applied to this invention, will be described with reference to FIG. 1 to FIG. 3.

An elliptic vibratory part-feeding device 1 has a feeder bowl 2. A spiral track is formed on the inner wall of the feeder bowl 2.

Figure 2:
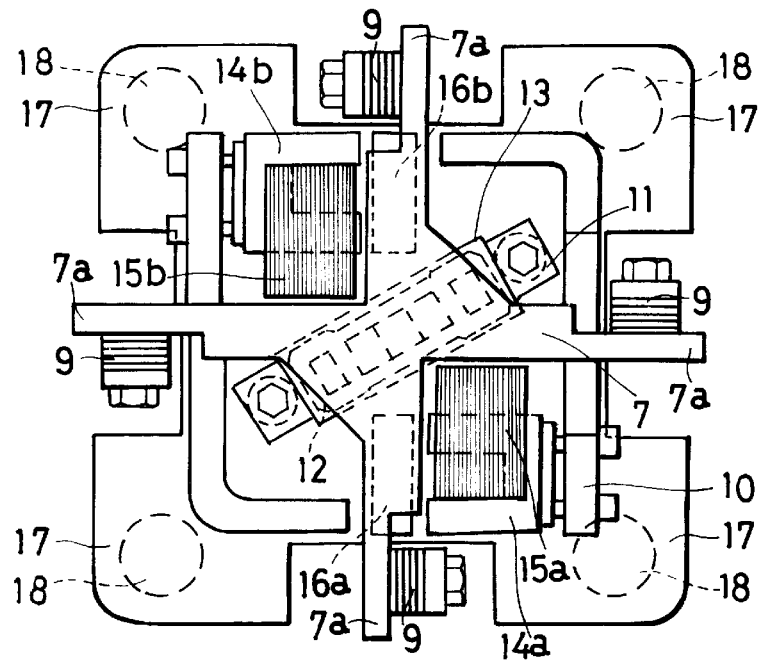
FIG. 2 is a plan view taken along the line II—II in FIG. 1
Figure 3:
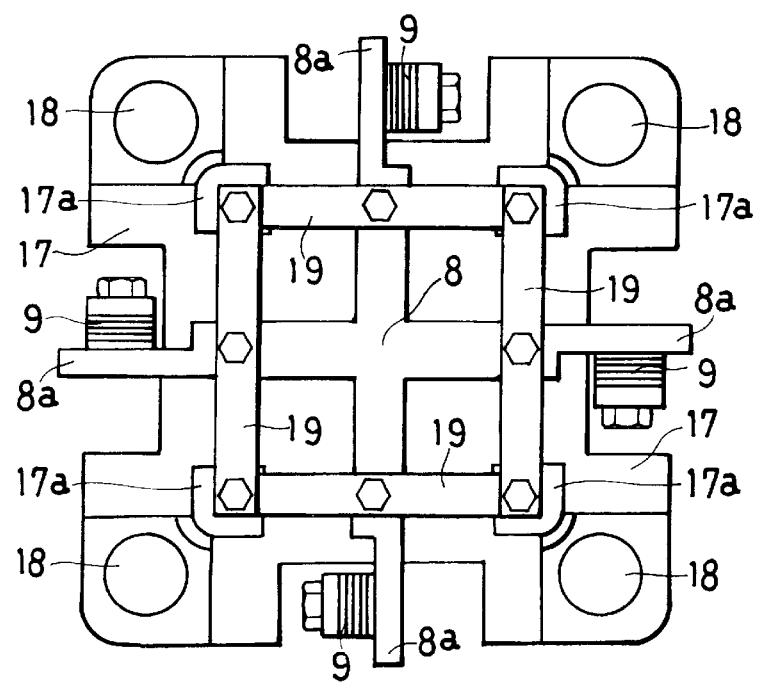
FIG. 3 is a bottom view of the elliptic vibratory part-feeding device of FIG. 1

The feeder bowl 2 is fixed at a cross-shaped upper frame 7, as shown in FIG. 2, which is combined with a cross-shaped lower frame 8, as shown in FIG. 3, by four sets of upright stacked leaf springs 9. Upper end portions of the stacked leaf springs 9 are fixed to four end portions 7a of the upper frame 7 by bolts. Lower end portions of the stacked leaf springs 9 are fixed to four end portions 8a of the lower frame 83 by bolts. The end portions 7a and 8a of the upper and lower frames 7 and 8 are vertically aligned with each other.

A vertical drive electromagnet 11 is fixed to a central portion of a base frame 10, facing to a central portion of the upper frame 7. An armature 13 for vertical drive is fixed to the lower surface of the central portion of the upper frame 7. An air gap is made between the vertical drive electromagnet 11 and the armature 13. A coil 12 is wound on the vertical drive electromagnet 11. A pair of horizontal drive electromagnets 14a and 14b are fixed to opposite side walls of the base frame 10 at both sides of the vertical drive electromagnet 11, as clearly shown in FIG. 2. Coils 15a and 15b are wound on the horizontal drive electromagnets 14a and 14b respectively. Armatures 16a, 16b for horizontal drive are fixed to the lower surfaces of the arm portions of the upper frame 7, facing to the electromagnets 14a and 14b. Air gaps are made between the armatures 16a and 16b and the electromagnets 14a and 14b, respectively.

Four leg portions 17 are formed integrally with the frame 10, and they are supported through rubber isolators 18 onto the ground. Spring receiving portions 17a are formed integrally with the corners of the leg portions 17, as clearly shown in FIG. 3. Four sets of horizontal stacked leaf springs 19 are fixed to the spring receiving portions 17a at the ends by bolts. As shown in FIG. 1, spacers 20 are arranged between the leaf springs 19. The central portions of the leaf springs 19 are fixed to the arm portions of the lower frame 8 by bolts.

In the above prior art, the phase difference between the currents flowing thorough the coils 15a, 15b and coil 12, is changed between 60° and 120° The parts are forwardly transported on the spiral track in the phase difference of 60°. When the part-jamming is detected, the phase difference is detected changed over from 60° into 120°. The parts are reversely transported on the spiral truck. Thus, the part-jamming can be removed.

However, as above described, parts of some kinds, which are different in shape, weight, size etc., are apt to be jammed. The phase differences should be frequently changed over to reverse the moving directions. Part-jamming means (although not shown) is arranged in the bowl 2.

Next, there will be described a control circuit according to one embodiment of this invention.

Figure 4:
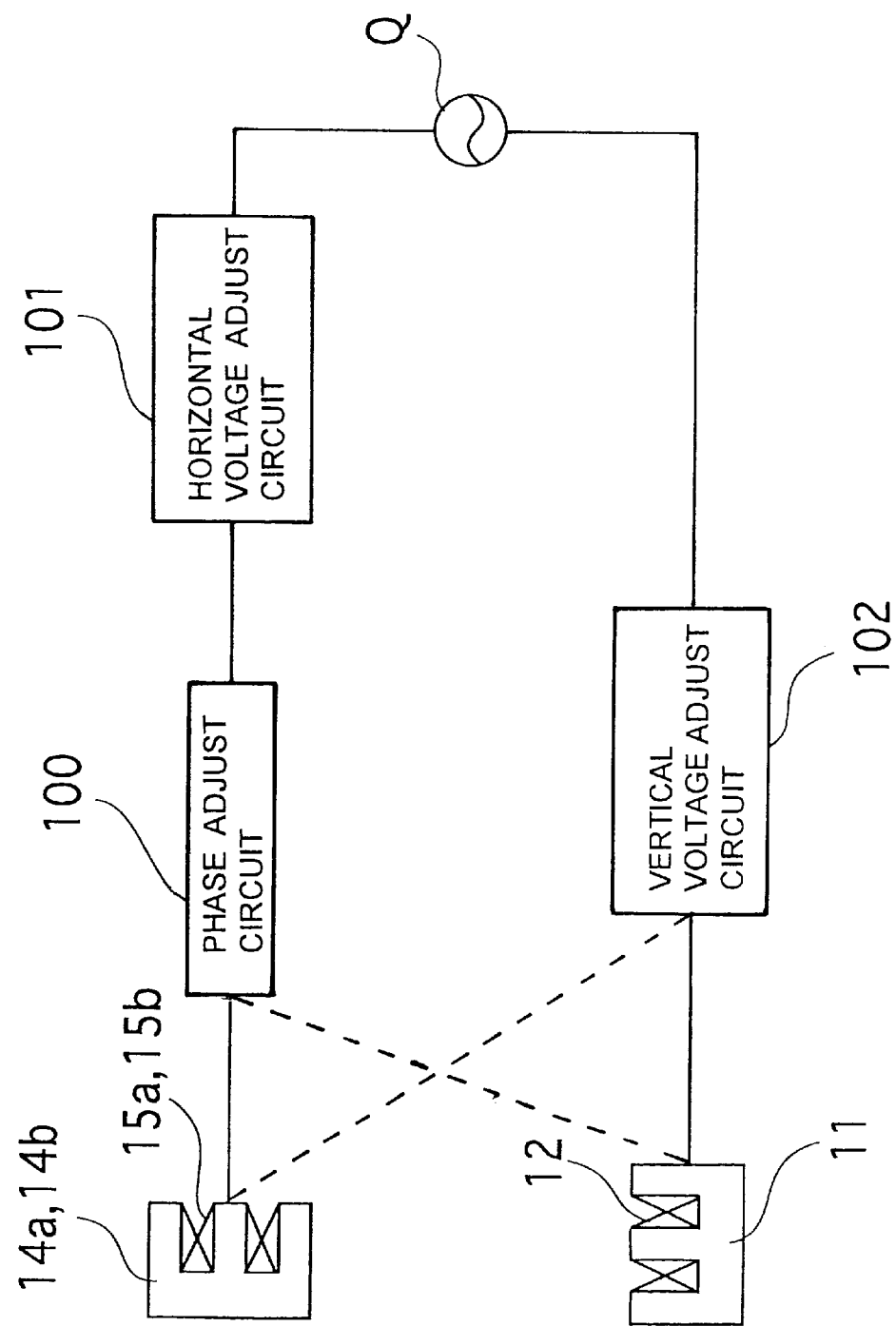
FIG. 4 is a block diagram of a control circuit according to one embodiment of this invention.
Figure 6:
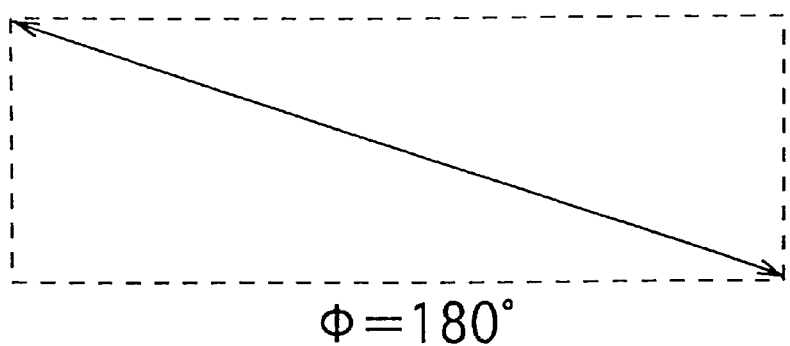
FIG. 6A to FIG. 6D show respective modes of elliptical vibrations obtained by the adjustments of the phase adjusting circuit.
Figure 6:
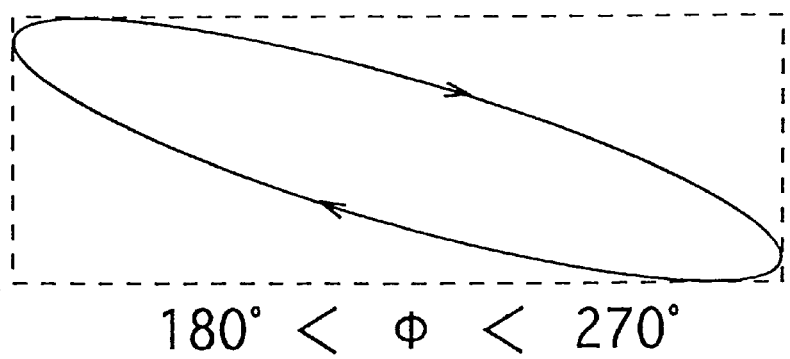
Figure 6:
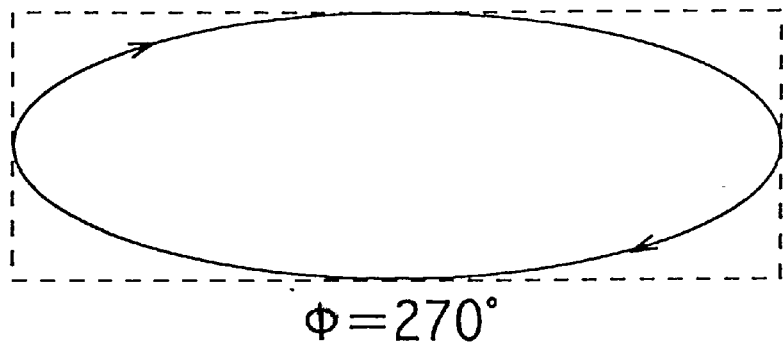
Figure 6:
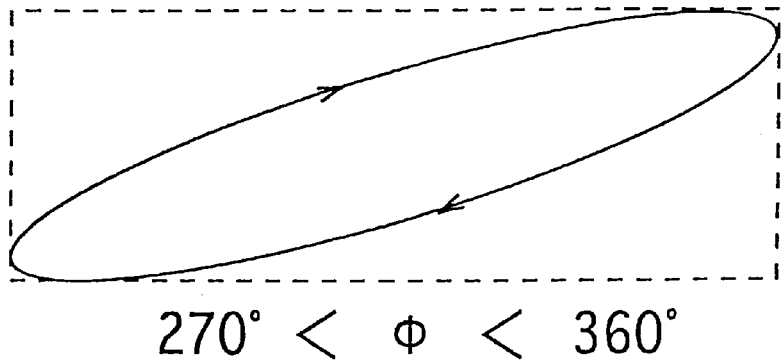

Referring to FIG. 4, a phase adjusting circuit 100 and a horizontal voltage adjusting circuit 101 are connected between an alternating voltage supply source Q of frequency ω and the electromagnetic coils 14a and 14b of the electromagnetic 15a and 15b for exciting the bowl in the horizontal direction. A vertical voltage adjusting circuit 102 is connected between the alternating voltage supply source Q and the electromagnetic coil 12 of electromagnet 11.

The phase difference $\phi$ between the currents flowing through the coils 15a and 15b and coil 12 is changed with the adjustment of the phase adjustment circuit 100.

As those of ordinary skill in the art will appreciate, the connections to coils 14a, b and 12 may be reversed as indicated by the dashed lines whereby the phase adjusting circuit 100 is connected either to coils 12 or to coils 14a, b.

The vertical force is equal to b sin ωt. The horizontal force is equal to a sin(ωt−φ). The modes of the elliptical vibrations are changed as shown in FIGS. 5A to 5D and FIGS. 6A to 6D, with the adjustment of phase adjustment circuit 100.

The inclinations of the longer axis of the elliptical vibrations can be changed with the adjustment of the voltage adjusting circuits 101 and 102 or phase adjustment circuit 100.

Generally, the transporting speed of the elliptical vibration is higher than that of the leaner vibration In the prior art, parts-jamming is more apt to occurs in parts-orientating means of some kinds or parts of some kinds. According to this invention, in consideration of prevention of the parts-jamming and suitable transporting speed, a mode of the elliptical vibration is selected. When the parts-jamming has occurred, for example, the mode is changed over from FIG. 5B into FIG. 6B so as to reverse the transporting direction.

When the parts-jamming is more hard to occur, and parts can be transported at a satisfactory speed by the linear-vibration (FIG. 5A or FIG. 6A), the mode (FIG. 5A or FIG. 6A) is selected. When the parts-jamming occurs, the mode is changed over from FIG. 5A or FIG. 6A into FIG. 6A or FIG. 5A.

Figure 7:
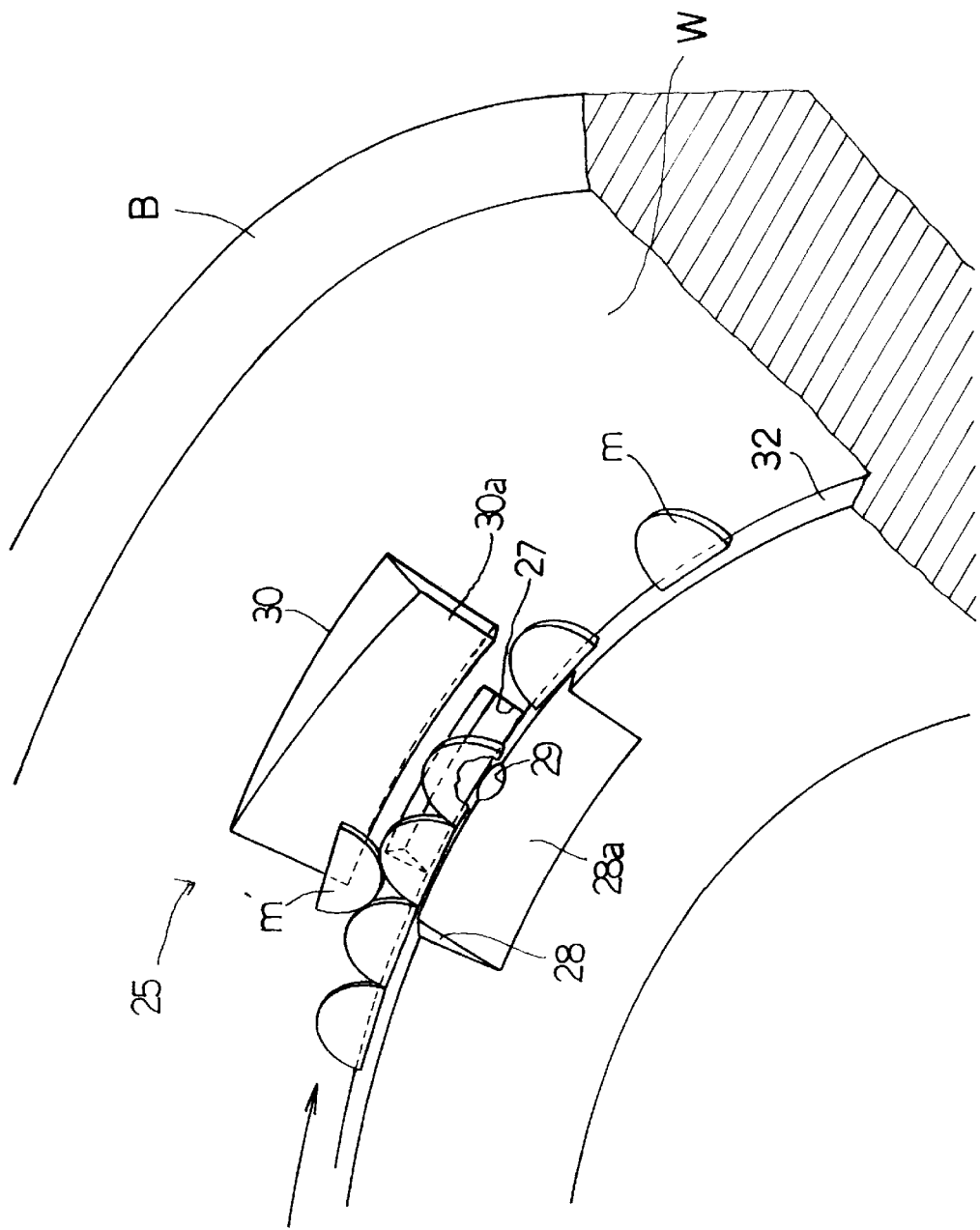
FIG. 7 is a partly-broken away perspective view of a parts-feeder to which this invention is applied.

In the bowl B of some kinds, as shown in FIG. 7 thin plate-like parts m are transported on a spiral track which consists of a conical wall surface W and narrow transport surface 32 nearly perpendicular to the conical wall surface W. The parts m lean to the conical wall surface W. The linear vibration is selected, since the parts m are more stably transported on the narrow transporting surface 32 along the wall W.

In FIG. 7, orienting means 25 consisting of block portion 30 and recess 27 orients the parts in while transported on the narrow path 32. A guide surface 30a of the block portion 30 curved inwardly and guides part m' lying on the part m outwardly into the bottom of the bowl B. When the parts mn are jammed between the block portion 30 and the path 32, the transporting direction is reversed. The mode of FIG. 5A is changed over into the mode of FIG. 5B. Thus, the jamming is removed.

Figure 8:
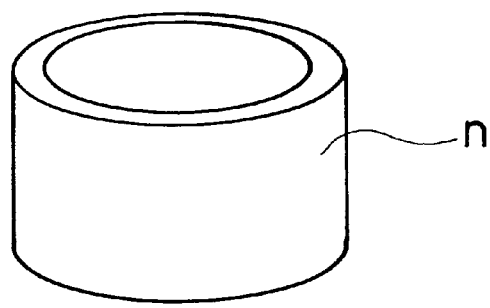
FIG. 8 is a perspective view of a part to which this invention is applied.
Figure 9:
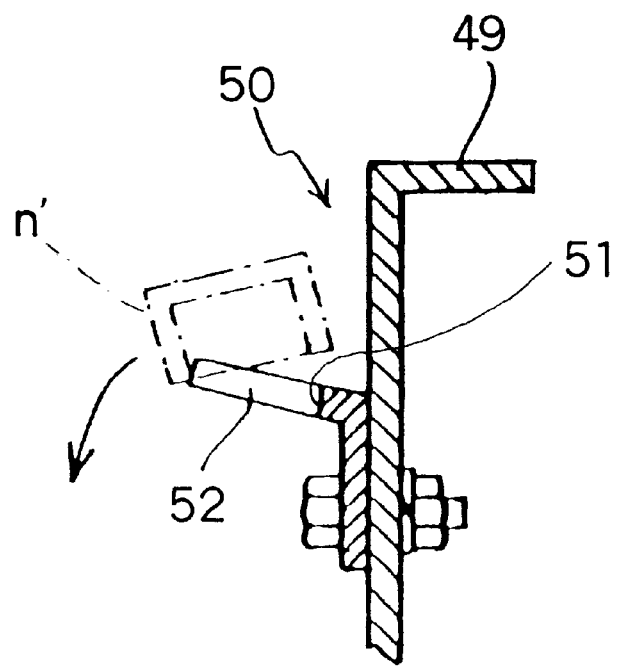
FIG. 9 is a cross-sectional view, take along the line [IX]—[IX] of FIG. 10.
Figure 10:
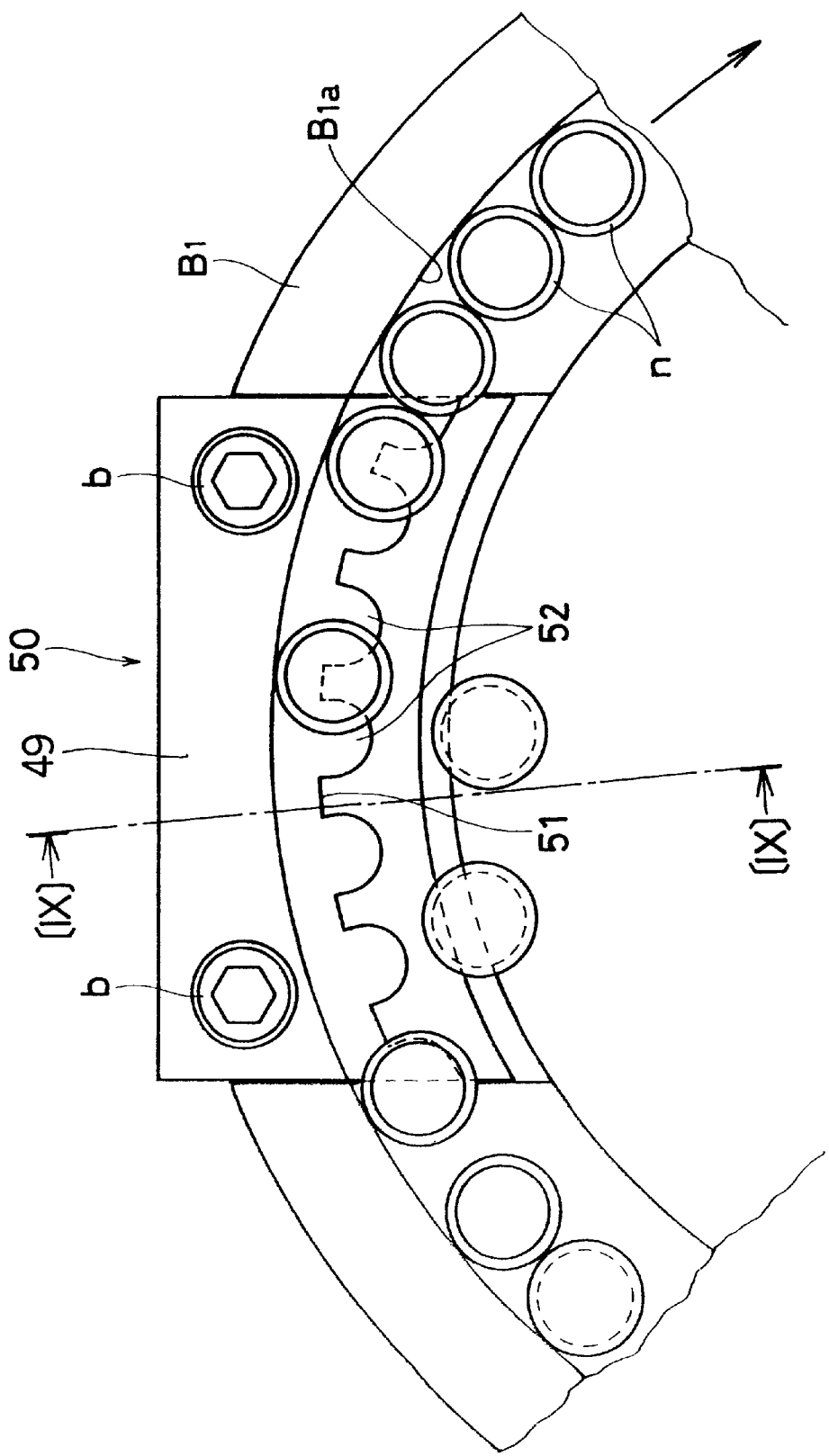
FIG. 10 is a partly-broken away plan view showing one example of posture-regulating means to which this invention is applied.

FIG. 9 and FIG. 10 show one example 50 of parts-orientating means for parts n shown in FIG. 8.

The parts-orientating means 50 is fitted into the a bowl B,. Semicircular projections 52 are formed at regular intervals on a plate 51 which is attached to a L-shaped member 49. A transport path is formed by the member 49 and the plate 51, and it is slanted outwardly in the radial direction of the bowl. The cap-like or cylindrical part n in the posture as shows in FIG. 8, passes on the projections 52 as shown in FIG. 10. However, the reverse parts n' as shown in FIG. 9 fall down from the projections 52 as shown by the arrow. When the parts n are transported at a higher speed, they are apt to be engaged with the projection 52, and the following parts n are stopped by the engaged parts n. The parts-jamming occurs here.

Figure 11:
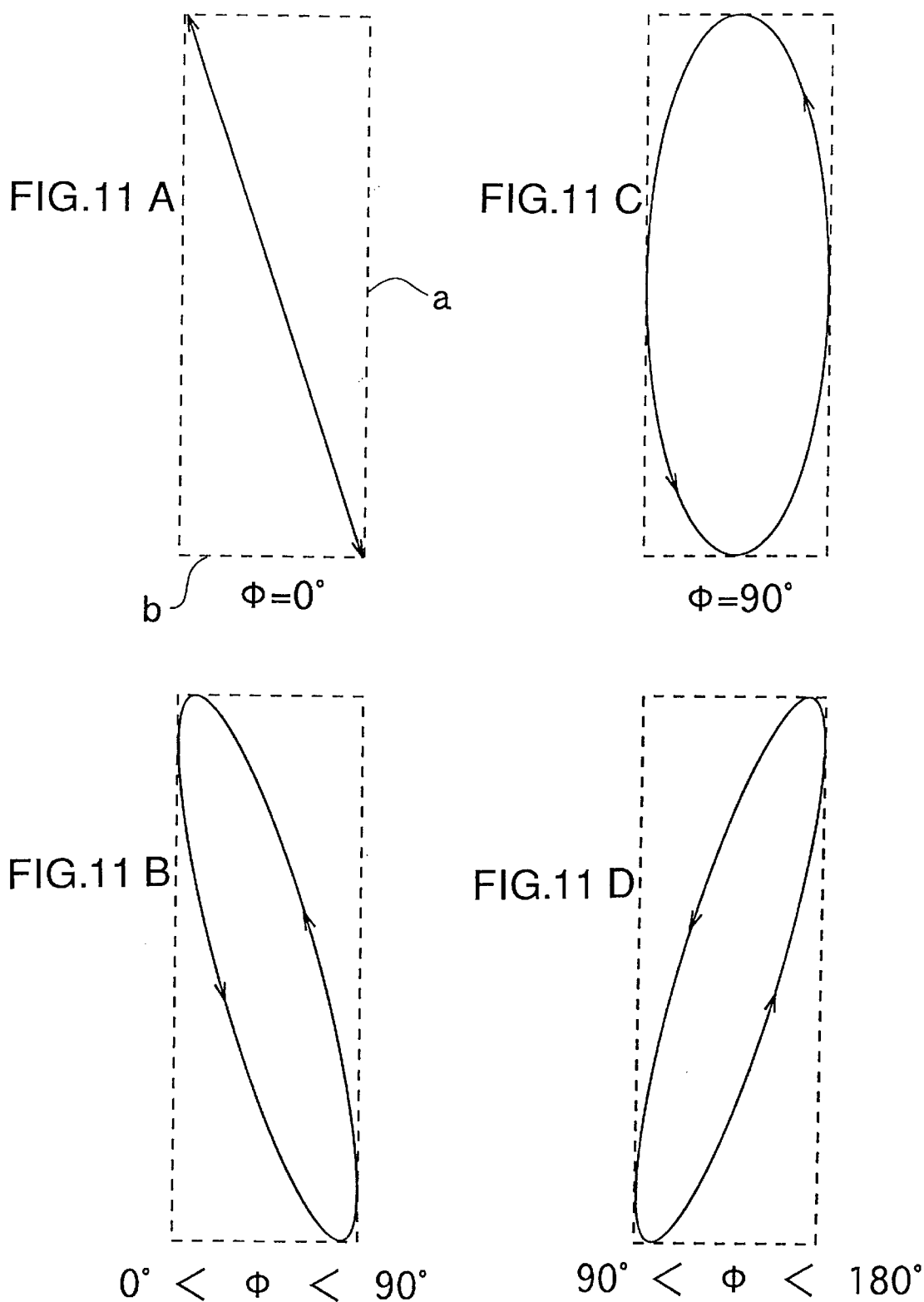
FIG. 11A to Fig. 11D show modes of the leaner and elliptical vibration obtained by adjustment of the voltage adjusting circuits and phase adjusting circuits.
Figure 12:
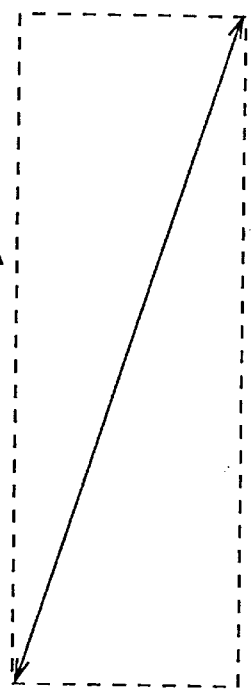
FIG. 12A to FIG. 12D show modes of the leaner and elliptical vibration obtained by adjustment of the voltage adjusting circuits and phase adjusting circuit.
Figure 12:
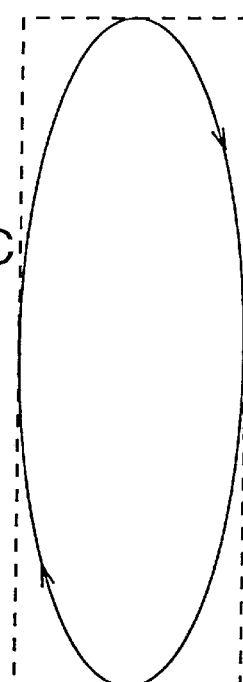
Figure 12:
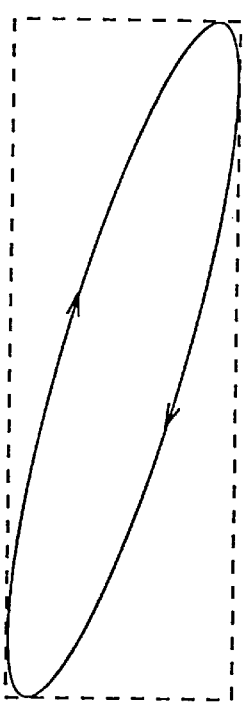
Figure 12:
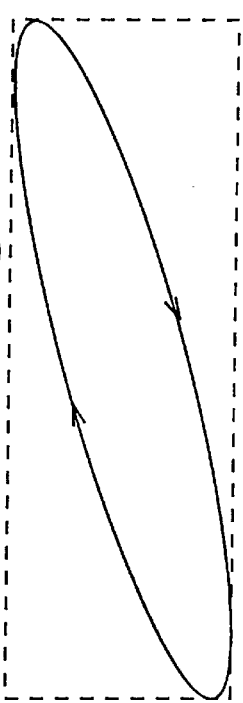

The horizontal and vertical voltage adjusting circuits 101 and 102 are adjusted so that the voltages are reversed. The modes are changed with the adjustment of the phase adjusting circuit 100, as shown in FIG. 11A to FIG. 11D and FIG. 12A to FIG. 12D. When the parts jam, for example, the mode of FIG. 12C or Fig. 11C is selected, so that the cap-like part n' is deengaged from the projection 52.

While the preferred embodiment has been described, variations thereto will occur to those skilled in the art within the scope of the present inventive concepts which are delineated by the following claims.

For example, in the above embodiment, the leaf springs 9 and 19 are used as spring means for the horizontal direction and the vertical direction in the elliptical vibratory part-feeding device 1. However, another spring means, for example, rubber spring may be used.

Further, in FIG. 4, the one voltage adjusting circuit 101 or 102 may be omitted. Further, any other elliptical vibratory drive mechanism may be used instead of the elliptical vibratory drive shown in FIG. 1 to FIG. 3.

What is claimed is:

1. In a vibratory parts-feeder comprising:

(A) a feeder bowl in which a spiral track is formed, (B) a vertical exciter with a first electromagnetic coil for exciting said feeder bowl in the vertical direction, (C) a horizontal exciter with a second electro-magnetic coil for exciting said feeder bowl in the horizontal direction, (D) first spring means for supporting said feeder bowl so as to be vibratile in the vertical direction, and (E) second spring means for supporting said feeder bowl so as to be vibratile in the horizontal direction, wherein there is a phase difference between the currents flowing through said first and second electro-magnetic coils and said feeder bowl is elliptically vibrated, the improvements in which phase adjusting means is connected to said first or second electro-magnetic coil, and the ratio of the longer to the shorter axis of the elliptical vibration or the inclination of the long axis of the elliptical vibration is varied with the adjustment of said phase adjusting means, so as to obtain an optimum condition with respect to a shape or size of a part to be fed, or with respect to orientation of a part to be fed.

2. In a vibratory parts-feeder comprising, (A) a feeder bowl in which a spiral track is formed, (B) a vertical exciter with a first electro-magnetic coil for exciting said feeder bowl in the vertical direction, (C) a horizontal exciter with a second electro-magnetic coil for exciting said feeder bowl in the horizontal direction, (D) first spring means for supporting said feeder bowl so as to be vibratile in the vertical direction, and (E) second spring means for supporting said feeder bowl so as to be vibratile in the horizontal direction, wherein there is a phase difference between the currents flowing through said first and second electro-magnetic coils and said feeder bowl is elliptically vibrated, the improvements in which phase adjusting means is connected to said first or second electro-magnetic coil, and said feeder bowl is vibrated elliptically or linearly with the adjustment of said phase adjusting means, so as to obtain an optimum condition with respect to a shape or size of a part to be fed, or with respect to orientation of a part to be fed.

3. In a vibratory parts-feeder comprising;

(A) a feeder bowl in which a spiral track is formed, (B) a vertical exciter with a first electro-magnetic coil for exciting said feeder bowl in the vertical direction, (C) a horizontal exciter with a second electro-magnetic coil for exciting said feeder bowl in the horizontal direction, (D) first spring means for supporting said feeder bowl so as to be vibratile in the vertical direction, and (E) second spring means for supporting said feeder bowl so as to be vibratile in the horizontal direction, wherein there is a phase difference between the currents flowing through said first and second electro-magnetic coils and said feeder bowl is elliptically vibrated, the improvements in which phase adjusting means is connected to said first or second electro-magnetic coil, voltage adjusting means is connected at least to one of said first and second electro-magnetic coils and the inclinations of the long axis of the elliptical vibration and linear vibration and the ratio of the longer to the shorter axis of the elliptical vibration are varied with the adjustment of said phase adjusting means and said voltage adjusting means, so as to obtain an optimum condition with respect to a shape or size of a part to be fed, or with respect to orientation of a part to be fed.

* * * * *